April 24, 1951 J. T. WILLIAMS ET AL 2,550,315
MEANS ASSOCIATED WITH COIN-CONTROLLED AUTOMATIC
PHONOGRAPHS TO PLAY SHORT ADVERTISING RECORDS
Filed Oct. 7, 1946 4 Sheets-Sheet 1
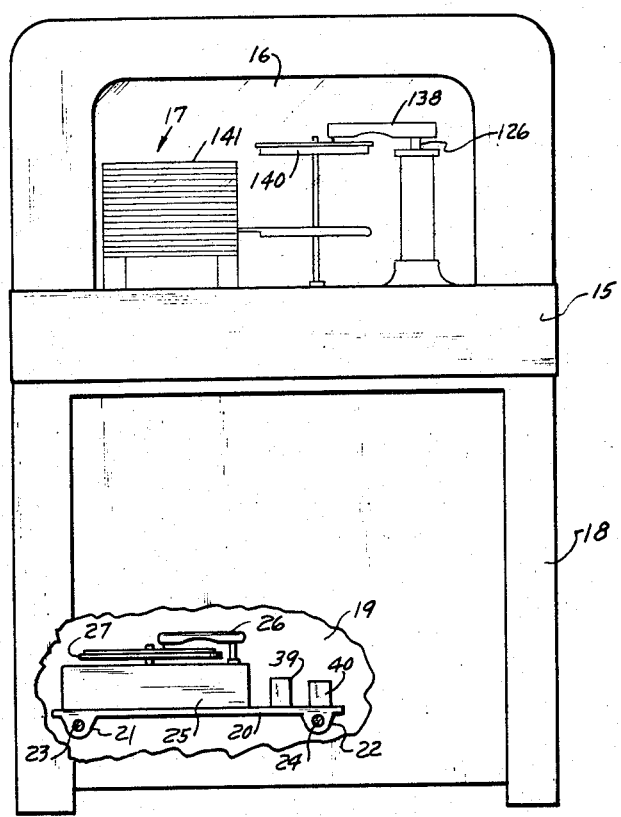
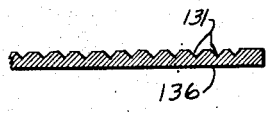
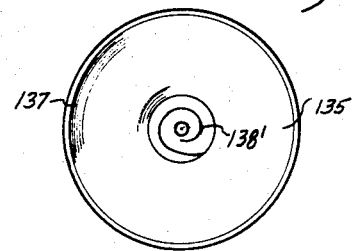
INVENTORS
JAMES T WILLIAMS
KARL F. RIESE
BY Whiteley and Caine
ATTORNEYS April 24, 1951  J. T. WILLIAMS ET AL  2,550,315
MEANS ASSOCIATED WITH COIN-CONTROLLED AUTOMATIC
PHONOGRAPHS TO PLAY SHORT ADVERTISING RECORDS
Filed Oct. 7, 1946  4 Sheets-Sheet 2
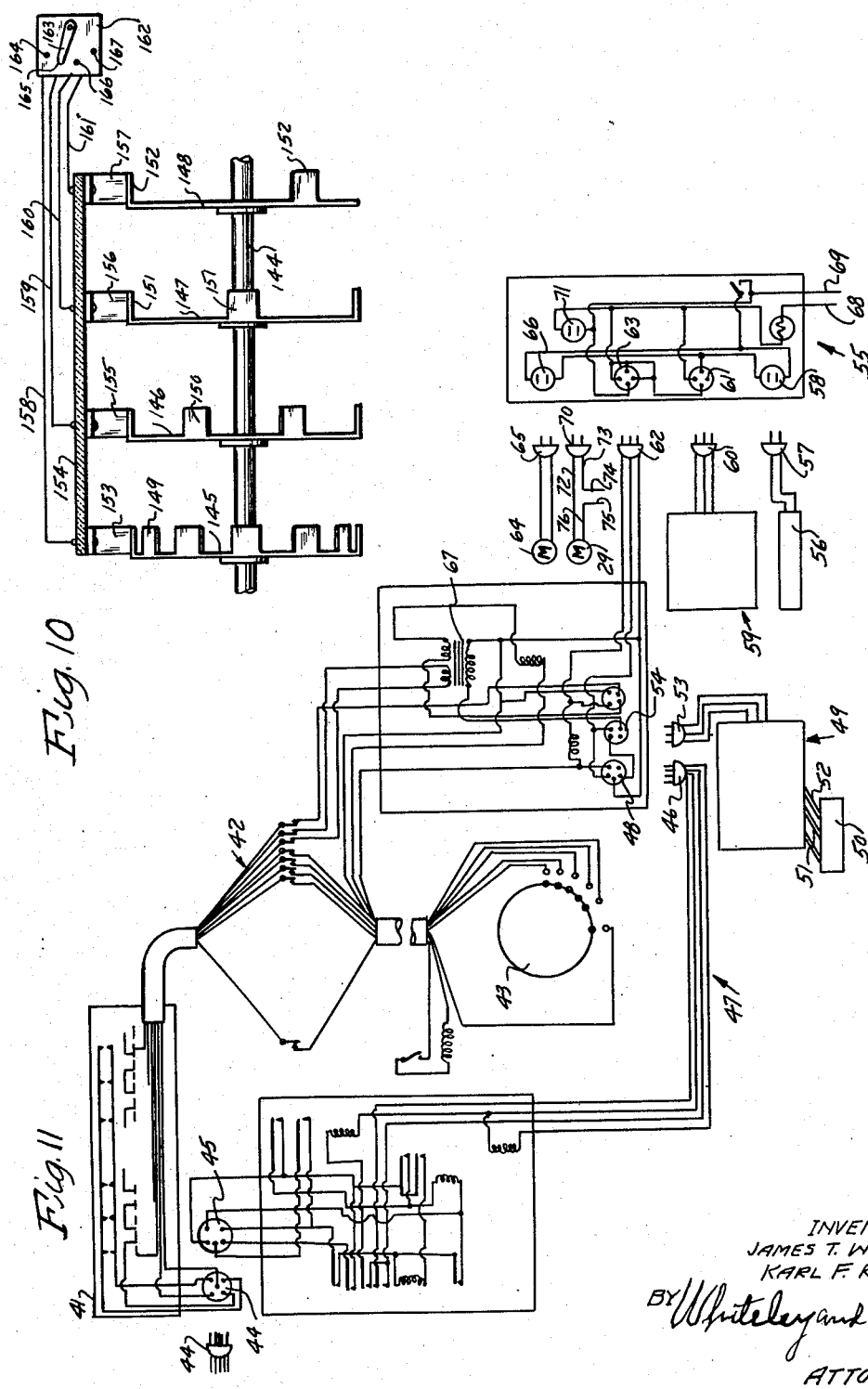
INVENTORS
JAMES T. WILLIAMS
KARL F. RIESE
BY Whiteley and Caine
ATTORNEYS April 24, 1951 J. T. WILLIAMS ET AL 2,550,315
MEANS ASSOCIATED WITH COIN-CONTROLLED AUTOMATIC
PHONOGRAPHS TO PLAY SHORT ADVERTISING RECORDS
Filed Oct. 7, 1946 4 Sheets-Sheet 3
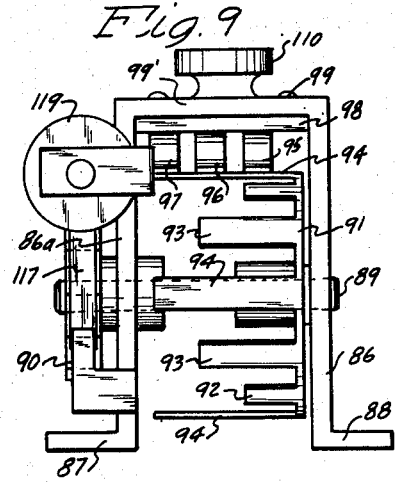
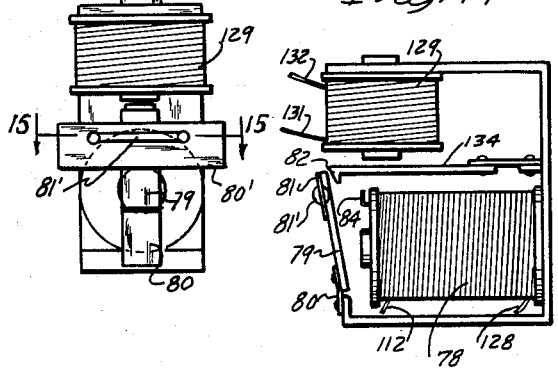
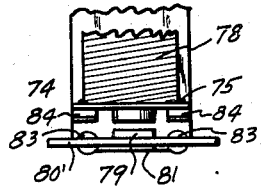
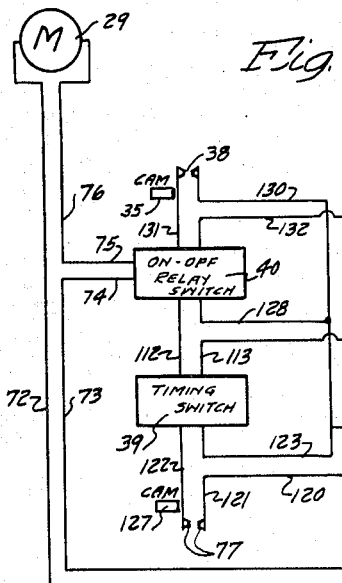
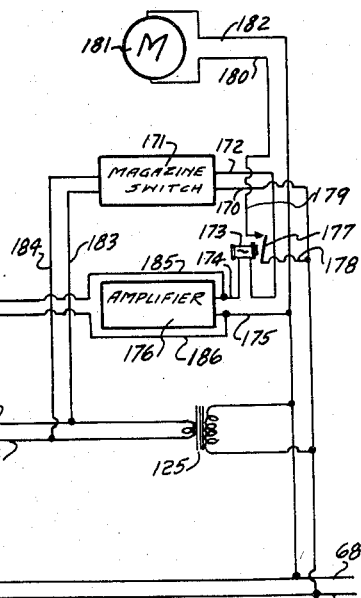
INVENTORS
JAMES T. WILLIAMS
KARL F. RIESE
BY Whiteley and Cain
ATTORNEYS

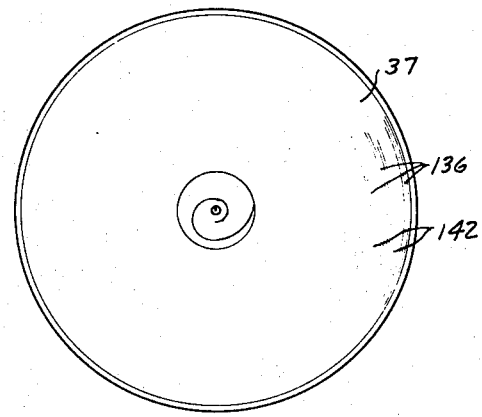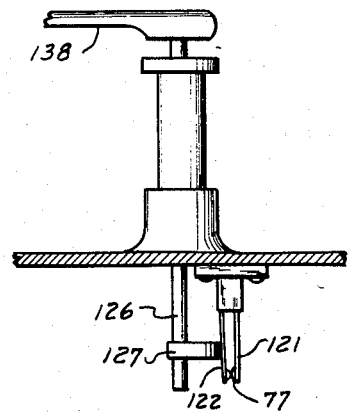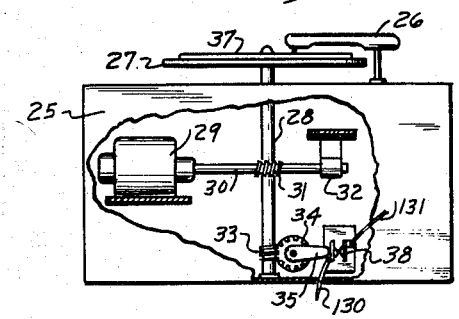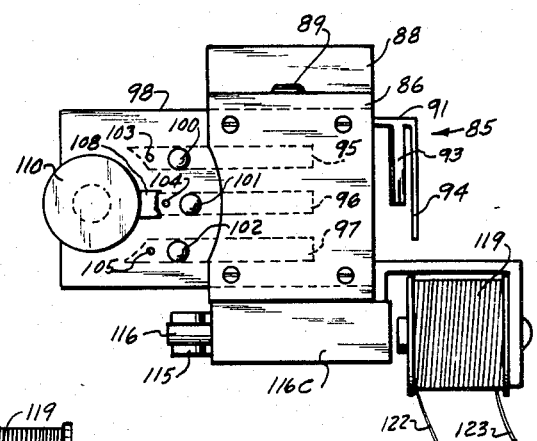

Patented Apr. 24, 1951

2,550,315

UNITED STATES PATENT OFFICE 2,550,315

MEANS ASSOCIATED WITH COIN-CONTROLLED AUTOMATIC PHONOGRAPHS TO PLAY SHORT ADVERTISING RECORDS

James T. Williams, Minneapolis, and Karl F. Riese, St. Paul, Minn.; said Riese assignor to said Williams Application October 7, 1946, Serial No. 701,798

3 Claims. (Cl. 274—10)

Our invention relates to means associated with a coin-controlled automatic phonograph to play short advertising records, and has for its object to provide an attachment to be installed in the case of an automatic phonograph which will be put in operation by the playing of a standard record, and will be effective for making short advertising announcements, which may follow each record played, or follow a sequence of such records, as, for example, two, three or four thereof.

Coin operated automatic phonographs in very large numbers are in operation throughout the country at the present time. These instruments provide means for playing selected records when a requisite coin is inserted in the instrument and the electric circuits for selecting the record have been closed both by the insertion of the coin and by the operation of a push button. When the circuit is closed a certain amount of time is required to take the selected record from a stack of such records and move it into position upon a rotating table where it is engaged by the reproducing needle on a needle arm moved into position for that purpose. After the record has been played a corresponding period of time ensues for the operation of the instrumentalities to take the record from the playing disk and restore it to the stack. This time between consecutive playing of entertainment records is wasted time, for even if a succeeding record is to be played the one that has just been finished must be put back into position and the succeeding record be taken from the stack, put on the rotating disk and have the needle arm brought into position thereon.

For a way to make practical use of this otherwise wasted time, we have discovered a means comprising a small, compact attachment adapted to be inserted into the instrument case, whereby during the otherwise wasted period a short advertising message may be reproduced. This provides both advertisements that can reach large numbers of listeners but which are given in a manner not to interfere in any way with the normal operation of the instrument, and also so as to use this otherwise wasted time.

It is a principal object of our invention, therefore, to provide an attachment to be installed in the casing of a coin-operated automatic phonograph for operating parts so related to the means for playing the standard entertainment records, and particularly the waste period of time for exchanging those records, such that an advertising message may be rendered during the period when the record mechanism is normally out of operation while the record that has been played is being replaced in the stack and (if that is called for) a succeeding entertainment record exchanged therefor.

It is a further object of our invention to provide in conjunction with the advertising means an independent motor and a table rotated thereby to effect reproduction of the advertising message.

It is a further object of our invention to provide means related to the aforesaid attachment which utilizes the amplifier and loud speaker of the automatic phonograph.

It is a further object of our invention to provide an advertising record with a multiplicity of advertising messages, all of which may be the same or which may be varied on the record, and having means for putting the advertising means out of operation when any one of the advertising messages has been completed.

It is a further object of our invention to provide a device in conjunction with the operating means for the advertising record which controls such operation to take place only during those periods of the operation of the automatic phonograph following the termination of the playing of one of the standard entertainment records and the beginning of the playing of another of such records.

It is a further object of our invention to provide a regulator switch as part of our attachment which can be set so that the advertising record will be played during any selected interval following the normal operation of the automatic phonograph in completing the playing of a standard entertainment record, before beginning to play a succeeding such record.

The full objects and advantages of our invention will appear in connection with the detailed description to be given hereafter in the appended specification, and the novel features by which the above noted advantages, useful and important results are obtained will be particularly pointed out in the claims.

In the drawings illustrating an application of our invention in one form:

Fig. 1 is a front elevation view of an automatic phonograph with a portion of the casing cut away showing the position of our attachment when installed.

Fig. 2 is a cross-sectional view of a portion of the standard record used on the automatic phonograph, greatly enlarged.

Fig. 3 is a plan view on a small scale of the entertainment record used in an automatic phonograph showing the playing grooves and the arm controlling spiral groove on the surface of the record.

Fig. 4 is a plan view on an enlarged scale of the special advertising record employed in connection with our attachment.

Fig. 5 is a part sectional elevation view of a portion of the tone arm assembly of the automatic phonograph.

Fig. 6 is a side elevation view on a small scale of an attachment box with parts broken away to show the shaft and other mechanism for operating the automatic record player forming part of our automatic phonograph attachment.

Fig. 7 is a top plan view of the timing switch used in our attachment for determining the times at which the advertising record shall be operated, whether after playing of a single record, of two records, of three records, or of four or more records.

Fig. 7a is a sectional view taken on line 7a—7a of Fig. 8.

Fig. 8 is a side elevation view of the parts shown in Fig. 7 viewed from the bottom side thereof.

Fig. 9 is a front elevation view of the parts shown in Fig. 7 viewed from the right hand side thereof.

Fig. 10 is a side elevation view of a modified form of timing switch performing the same function as the timing switch illustrated in Figs. 7, 8 and 9.

Fig. 11 is a schematic wiring diagram showing the general arrangement of the circuits controlled respectively by selector buttons and by coins to produce normal operation for reproducing the matter upon an entertainment record and showing schematically the relation of the motor for operating the advertising record to the line feed, the amplifier and the loudspeaker as a part of the automatic phonograph set-up.

Fig. 12 is a wiring diagram showing the special electric circuits going to our attachment in relation to certain circuits of the automatic phonograph.

Fig. 13 is a front elevation view of the on and off switch which controls the interval of time of the period of operation of the advertising record in our attachment.

Fig. 14 is a side elevation view of the on and off switch shown in Fig. 13.

Fig. 15 is a transverse sectional view taken on line 15—15 of Fig. 13.

As illustrated, and referring first to Fig. 1, an automatic phonograph case 15 has a customary glass protected opening 16, through which can be seen the apparatus for carrying into position and playing the standard entertainment records, which is designated generally by the numeral 17. The lower part 18 of casing 15 is shown broken away at 19.

Positioned within the lower part of the casing, as seen through the broken-away opening 19, is a rack 20 which is provided with sets of downwardly extended ears 21 and 22. Through openings in the ears 21 and 22 extend supporting rods 23 and 24. Upon the rack 20 is mounted a special casing or box 25 which houses the motor and the means for swinging the tone arm assembly into playing position above the rotatable disk 27, which is mounted upon a vertical shaft 28 connected inside of casing 25 with the motor.

As shown in Fig. 6, the motor and parts operated by it, including a cam-actuated timing switch, are mounted within the casing or box 25.

As shown in Fig. 6, the motor 29 in attachment box 25 has its shaft 30 in driving connection with vertical shaft 28 through worm gearing 31, the shaft 30 being further supported by a bracket 32 toward the end thereof. Operated by worm gearing 33 on shaft 28 is a worm wheel 34 which carries a cam 35.

The gearing is arranged so that the worm wheel 34 and the cam 35 makes one complete revolution after a sufficient number of revolutions of the table 27 to play one advertising strip section, as indicated schematically at 36, on the advertising record 37 shown in Fig. 4. The cam 35 at the end of the revolution will contact the members of switch 38 and close this switch, which by means hereinafter described will terminate the operation of motor 29 and the rotation of table 27 and of the record 37 thereon.

Upon the rack 20, as shown schematically in Fig. 1, is a timing switch 39, which is shown in detail in Figs. 7, 8 and 9. There is also shown schematically a relay switch 40 which is shown in detail in Figs. 13, 14 and 15. The relation set up in our attachment of the above described means to the coin and button-controlled means for operating the turntable in the changing and playing of an entertainment record is what produces the effective operation and termination of the advertising record, all included, except for wire connections shown in the wiring diagrams, upon the attachment itself mounted upon rack 20.

In Fig. 11 there is shown the general schematic wiring diagram for operating a coin-controlled and selector button-controlled automatic phonograph of well known construction. Without going into detail as to the specific circuits, which are well known, the pertinent relations are indicated in Fig. 11, in connection with which will be given a brief description of the normal cycle of operation of the record-changing and playing units for an automatic phonograph of standard construction.

This is a definite cycle which does not vary from time to time if the machine is operating properly. Normally the person using the automatic phonograph must do two things before the instrument will operate to give a reproduction from an entertainment record. He must first select the record he wishes to play and push a button corresponding with that record on a keyboard for that purpose, and then he will insert a coin in a suitable receiving slot for that purpose. The effect of these two operations is to complete a circuit whereby the record changing mechanism will operate to put the selected record into playing position and the playing mechanism will rotate the record in conjunction with a reproducing tone arm to the completion of whatever matter has been recorded on the record.

At the time of completion, standard instrumentalities operate to restore the record to the stack and set the parts for another operation, which may take place immediately, if a second coin has been inserted and a second selection has been made, or which may await a further push button selection and coin introduction.

There is, therefore, an interval of time which must intervene after the termination of reproduction of any record and while the record is being restored to the stack and if an additional coin has been inserted, to start a new operation, involving changing and bringing into position another record. And since our attachment is independently mounted for operation within the above broadly defined facts, and operation of the automatic phonograph effects the reproduction of the advertising message in that time interval, a brief description of the general arrangements which effect the selection and playing of any record is here pertinent.

Referring to Fig. 11, which is a schematic wiring diagram, only as fully produced as is needful for the above purposes, a series of keyboard selector switches indicated at 41 are adapted to be operated by a corresponding series of pushbuttons, levers or the like, not shown. The number of such switches and levers is, of course, a matter of choice, but a common number is 22, indicating that the stack of records to be reproduced will contain 22 records, and there is an operating button or lever for each of the 22 records. The wires from the several selector switches go to a terminal board indicated at 42 from which they are distributed to a selector wheel 43, the details of which are not shown, but which, upon rotation by the circuit selected and when that circuit is closed by the insertion of a coin, sets in operation the record changing mechanism to take the selected record from the stack and move it to playing position.

The connector plug 44 will have its prongs inserted in the connector socket 45, as indicated in the upper corner of Fig. 11, and connector plug 46 carrying battery of wires 47 will be connected with connector socket 48. By means of these electric connections, the details of which are not specifically shown, since they are old and well known, the proper circuits are established to cause the selector wheel to move to the proper position to cause operation of the record changer to take the selected record from the stack and deliver it to the rotatable playing table when line current is delivered to the circuits.

As shown at the bottom of Fig. 11, there is a motor-drive coin switch indicated generally at 49 and embodying a slide member 50 with coin deposit channels 51 and 52 for receiving different sizes of coins. When the slide 50 is pushed in, the circuit will be closed to line current by means of connector plug 53, having its prongs inserted in connector socket 54.

A junction box 55 for receiving line current is normally connected with an amplifier 56 by a plug 57 in socket 58. Similarly, the magazine switch 59 on which the number of plays is registered is connected by means of plug 60 with socket 61.

The coin circuit closing is effected through a coin switch plug 62 and a coin switch socket 63, and finally the motor 64 for driving the playing table is connected through a plug 65 and socket 66 with the current in the junction box 55. Transformer 67 of usual construction controls the voltage for the relay and switch circuits of the selectors. Line current is delivered to the system through line wires 68 and 69.

The above instrumentalities need not be described more in detail, as they are the standard and well known operating means for coin controlled automatic phonographs.

Shown on the wiring diagram, Fig. 11, is the motor 29 of the attachment which forms the subject matter of our invention and which is connected by plug 70 with a socket 71 added to the equipment normally found in the junction box. Current is thereby carried to the motor 29 through a wire 72 connecting with plug 70, a second wire 73 also connecting with plug 70, and having an extension 74 running to control switches hereinafter described, and said extension 74 returning through an extension wire 75 to wire 76 which goes to motor 29. With this arrangement it will be apparent that, subject to the control switches hereinafter described the motor 29 will be caused to operate the rotating table carrying the record 37 and will be connected with the amplifier 56.

Referring now to Fig. 12, the circuits above described can carry line current to the motor 29 only when switch 77 is closed. Switch 77 controls current going to solenoid 78, Fig. 14. When the solenoid 78 is energized, armature bar 79 is pulled on its spring hinge 80 to bring its upper edge 81 beneath spring hook 82 and to bring electric contact between one or more buttons 83 on Bakelite plate 80' and contact fingers 84. The latch 82 then holds the armature bar 79 so that buttons 83 contact springs 84, thus closing the circuit to motor 29 through the bar 81'.

This closes the circuit to the motor 29 except for a timing switch 39, indicated schematically in Fig. 12 and somewhat in detail in Figs. 7, 8 and 9 inclusive. The timing switch 39, as shown in Figs. 7, 8 and 9, breaks the circuit between the current going to the solenoid 78 excepting for the time which elapses between that of a complete change of records to its end, that is the time required to restore the entertainment record which has just been operated to the stack and to take a new record from the stack and put it in operative position.

The time switch itself may be constructed to operate after every entertainment record which is played, after every second entertainment record played, after every third record, or after more records. The advertisement which is reproduced will, therefore, follow every record, every second record, every third record, or every fourth or greater number of records.

With one form of timing switch 39, shown in detail in Figs. 7, 8 and 9, and indicated by general reference character 85 a bracket member 86 is provided with flanged feet 87 and 88 by which it is rested upon and secured to any suitable support. Within the frame 86 is mounted a rotatable shaft 89 which carries at one end a ratchet 90 and toward the other end inside of frame 86 a contact wheel 91.

The contact wheel 91 as shown in Figs. 8 and 9 is provided with three sets of fingers designated separately as 92, 93 and 94, which are, respectively, of successively greater length. The fingers 92, 93 and 94 are positioned so as to contact the metal contact fingers 95, 96 and 97 carried by a plate 98 which is held by screws 99 upon the top 99' of the bracket member 86.

The shorter finger 92 will contact only finger 95. The intermediate finger 93 will contact the two fingers 95 and 96, while the longer finger 94 will contact the fingers 95, 96 and 97.

It follows that when electrical connection is made through finger 95 it will close an operative circuit each time the contact wheel is rotated one notch, and there will be an establishment of a circuit to play the advertising record every time that an entertainment record has been played and completed. When electrical circuit is made through the contact 96 it will require two forwarding movements in order that fingers 93 and 94 may make contact and reproduce an advertising message, so such a message will be given only after rendition of two entertainment records. And when the contact member 96 is in the circuit the longest contact member 94 alone will engage it and it will take three movements or the rendition of three enterainment records to bring about the reproduction of an advertisement from the advertising record.

The several contact fingers 95, 96 and 97 are shown in dotted lines in Fig. 7 and each of them has a contact button 100, 101 and 102, respectively, which are spaced apart laterally, as indicated in Fig. 7. Contact button 100 is in the path of the shortest finger 92, and of the two longer fingers 93 and 94. The contact button 101 is not engaged by the short fingers 92 but is engaged by the two longer fingers 93 and 94 and contact button 102 will be engaged by only the longest fingers 94.

Each of these spring fingers 95, 96 and 97 is riveted at 103, 104 and 105, respectively, to the plate 98 and is provided with a contact face 106 which is in the path of movement of one or more of the fingers 92, 93 and 94, and the respective buttons 100, 101 and 102 each has a portion 107 which extends through to the under side of the insulated plate 98, as shown in Fig. 8.

The spring fingers 95, 96 and 97 are of conducting metal and the buttons 100, 101 and 102 are also of conducting metal and carry current from one or the other of said buttons through a bar 108, which is mounted on the base 109 of knob 110 adapted to be turned to bring the bar 108 to contact any one of buttons 100, 101 and 102. The contact screw 111 connects with the wire 112. The other wire 113 of the circuit is secured to the base 87.

With this arrangement the circuit may be manually adjusted to carry current through any one of buttons 100, 101, and 102, to determine whether an advertising message shall be rendered every time an entertainment record is reproduced, after each two of such records are reproduced, or after three of such records are reproduced. And, of course, the number of fingers such as 92, 93 and 94 may be, if desired, substantially increased. The value of this arrangement resides in the fact that the operator may predetermine how frequently the advertising message will be rendered, but always at the close of the reproduction of an entertainment record, using the otherwise wasted time consumed in restoring the entertainment record just played to the stack and in bringing another entertainment record into playing position.

Obviously when the setting of the bar 108 is to contact the first button 100 there always will be an advertising message rendered at the close of the playing of each entertainment record. But for the other contact fingers 93 and 94 it is necessary for the contact wheel 91 to be moved forward a step at a time in conjunction with or by means of the shaft 89.

This is effected by means of a pawl 114 which is pivoted at 115 to an armature slide 116 as best shown in Figs. 8 and 9, the armature slide 116 is mounted in a piece 116a. The armature 116 may preferably be in the form of a cylinder with pieces 116a having a cylindrical opening 116b through the center in which armature 116 slides. As shown in Figs. 7 and 7a the holder 116a will preferably be secured, by welding or otherwise, to a bracket member 116c fast to one leg 86a of bracket member 86. The armature slide is normally held in the position of Fig. 8 by means of a leaf spring 117 secured to the holder piece 116a, in which position the pawl 114 engages the face of one of the teeth 118. The armature slide 116 is pulled forward every time the solenoid 119 is energized. And that forward movement through the pawl 114 moves the ratchet wheel 90 forward one notch and with it rotates the contact wheel 91 the equivalent of one notch.

The solenoid 119 is connected in a circuit made up of wires 120, switch wires 121 and 122 and return wires 123 and 124, which carries current from the line wires through the step-down transformer 125, all as shown in Fig. 12. This circuit can be effective only when switch 77 is closed, and the closing of this switch takes place when the tone arm shaft 126 of the regular automatic phonograph reproducing mechanism, Fig. 5, has turned a predetermined degree such that the cam 127 on shaft 126 is brought into engagement with the switch prong 122 and thus closes the switch 77.

This cam is of small contact area which, however, energizes the solenoid 119 long enough to pull the armature slide 116 forward and move the contact wheel 91 one step.

If the circuit including wires 122 and 123, Fig. 12, has been closed through the switch 77 operated by the cam 127, when the bar 108 contacts a button which is in circuit with the position of the contact wheel 91 after it is operated, current will be passed through wires 112 and 113 to the on-off relay switch, which includes the wires 112 and 128, operating solenoid 78. This swings the armature bar 79 into position to come under the latch 82 and brings into contact the contact members 83 and 84, thus closing the circuit through wires 73, 74, 75 and 76 and wire 72 for return current from the line wires 68 and 69.

This establishes line wire current to the motor 29 which operates the table 27 and the advertising record 37 thereon contacted by the auxiliary or advertising tone arm 26 and needle thereon.

This will at the same time reproduce the advertising message and open the switch 38. This will not affect the current passing through contacts 83, 84 and plate 81', since the latch 82 maintains the contacts between buttons 83 on Bakelite plate 80' and contact fingers 84, even though the solenoid 78 no longer receives current through the wires 112 and 128 and is de-energized. This is made possible because the switch 38 will be opened, by reason of the fact that the cam 127 on tone arm 126 moves to cause breaking of the circuit at switch 77.

As shown in Figs. 13 and 14, a solenoid 129 may receive current from wires 131 and 132, as appears in the diagram of Fig. 12. Wires 130 and 131 go to the switch 38 adapted to be closed by the cam 35. This puts the solenoid 129 in circuit with the current from transformer 125 through wires 124, 130, 131, 132 and 133. In other words, whenever the switch 38 is closed by the cam 35 the solenoid 129 is energized.

This will have the effect of lifting armature 134 carrying the hook 82, which will pull this hook from its position over the edge 81 of spring armature 79, permitting the armature to spring back to its position in Fig. 14 and thus break the circuit to the motor, which results in stopping the motor.

From the above it will be apparent that the switch 77 will be closed by the cam 127 on tone arm shaft 126 long enough to establish the circuit to the motor and put the motor in operation, and that that operation of the motor through worm wheel 34 will move cam 35 to open the switch 38 to break the circuit to solenoid 129 while the circuit to solenoid 78 is still maintained closed, and thereafter the hook 82 will hold the spring armature 79 in position to maintain closed the motor circuit.

The wiring diagram of Fig. 12 indicates how the line current is related to the motor for operating the automatic phonograph to render the matter on entertainment records and how that wiring, so far as relates to the amplifier, may be made effective in the reproduction of the advertising messages.

As shown in Figs. 1 and 12, line wire 69 goes through a branch wire 170 which goes to the magazine switch 59 indicated diagrammatically at 171 in Fig. 12. From the magazine switch 171, a wire 172 connects with the solenoid 173, which transmits current through wires 174 and 175 to the amplifier 56 indicated diagrammatically at 176 in Fig. 12.

At the same time the solenoid 173 will swing switch member 177 to close a shortened circuit through wires 178 and 179 to wire 180 going to motor 64 indicated diagrammatically at 181 in Fig. 12, which operates the shaft 139 driving playing table 140. The return current goes through branch wire 182 to line wire 68.

The magazine switch 171 includes a solenoid, not shown, which receives current from the stepdown transformer 125 through wires 183 and 184 connecting, respectively, with wires 133 and 124.

It will be apparent from the above that only when the circuit is closed in the magazine switch 171 by the coin-controlled means hereinbefore set out can current go to motor 181 to operate the same.

Branch wires 185 and 186 from the amplifier wires 174 and 175 connect with wires 187 and 188 which in turn are connected to the wires 133 and 124 for operating the motor 29 with line current which has been subjected to the action of a transformer and amplifier and which is controlled directly to the motor 29 by instrumentalities above described, as indicated in the wiring diagram of Fig. 12. In that diagram the switch 77 is shown as being operated by the cam 127 on tone arm shaft 126, as shown in Fig. 5. Likewise the switch 38 is shown in the diagram as being operated by cam 35 which is mounted to be driven by worm 33, on shaft 28 for rotating the advertising record table 37, through worm wheel 34, as shown in Fig. 6. As shown in the diagram of Fig. 12, such modified line current to the motor 29 for the playing of the advertising record is established by the almost simultaneous closing of the timing switch 39 and the on-off relay switch 38, and such current is broken when the on-off relay circuit opens switch 38. It follows that with this wiring hook-up the auxiliary motor 29 for the advertising messages can not be operated at the same time as the motor 181 for the entertainment records, and that the amplifier receives operating current, whether the connection is with line current to motor 181 or with line current to the auxiliary motor 29, which is controlled by on-and-off switch 40. The amplifier is connected with the auxiliary tone arm 26 by means of a cable indicated in Fig. 6, which, being standard practice, is not illustrated in detail.

Referring to Figs. 2 and 3, a standard record is indicated at 135 and a part thereof in section at 136 on a greatly magnified scale in Fig. 2.

As is well known, the standard record has cut thereon a continuous spiral groove 137 which in combination with the needle on the tone arm 138 causes reproduction of matters recorded in said spiral groove of a standard entertainment record. The spiral groove 137 maintains its successive parts in substantial parallelism until at a point toward the center of the record it departs sharply from that parallelism in a special spiral indicated at 138' in Fig. 3, and it is this last-named spiral which closes circuits that effect three operations.

First, the shifting of the tone arm 138 to a non-playing position through operation of shaft 126. Second, the return of the record on the table 140 to the stack of records indicated at 141 in Fig. 1, and third, the termination of operation of the motor for driving the shaft 139 and record table 140.

It is the movement of the tone arm shaft 126, as heretofore described, and of the cam 127 thereon which closes the switch 77 to in turn close the circuit to the motor and put that in operation and the reproduction of the advertising message on the special advertising record employs the same amplifier and loudspeaker that are employed in rendering entertainment records, as has been heretofore pointed out.

The advertising record 37 employed by us, is shown on an enlarged scale in Fig. 4. The grooves 36 are similar to the grooves in a standard record, excepting that they will carry recordings in sections, as shown at 36 in Fig. 4, with intervening sections 142 which simply have plain grooves without recordings.

The purpose of this arrangement will be very plain. For the advertising messages are necessarily short, since they must be completely rendered in the period of time necessary to restore the automatic phonograph tone arm, record and playing table to inoperative position and to exchange a succeeding record if it is to be played at once. Thus upon the single record 37 a large number of advertising messages may be recorded, which may all be identical or may vary in the form and language used.

The record 37 which reproduces these advertising recordings, is in all other respects identically the same as the standard entertainment record, and has a central widely spaced spiral groove 143 similar to the spiral groove 138' on such a standard record.

When, therefore, the needle reaches the spiral groove 143 the special tone arm 26 will be swung back to have its needle engage in the first grooved portion 36 to start playing over again the various advertising messages on record 37. The means of doing this is well known and is the same for the advertising record and tone arm as for the standard entertainment record and tone arm, and, although complicated, need not be described herein.

A modified form of time switch is shown in Fig. 10. In this arrangement a shaft 144 has thereon a series of contact wheels 145, 146, 147 and 148.

These several contact wheels have contact fingers 149 on wheel 145, 150 on wheel 146, 151 on wheel 147, and 152 on wheel 148. These contact fingers are severally spaced greater distances apart, as clearly shown. The contact fingers 149 are adapted to engage a spring contact piece 153 on or secured to insulating plate 154. Similarly, fingers 150 engage a contact piece 155, fingers 151 engage a contact piece 156, and fingers 152 engage a contact piece 157, all secured to the plate 154.

Wires 158, 159, 160 and 161 lead to a switch box 162 which has thereon a contact arm 163, which may make contact with a series of buttons 164, 165, 166 and 167 to close circuits respectively through contact wheel 145, through contact wheel 146, through contact wheel 147, or through contact wheel 148.

These contact wheels are of such a nature that the first wheel 145 will contact at every step movement of shaft 144 or at the end of each entertainment record which is played. The contact wheel 146 will close the circuit after two entertainment records have been played; contact wheel 147 will close the auxiliary circuit after three contact records have been played, and contact wheel 148 will close the circuits for operating the advertising record after four entertainment records have been played.

The advantages of our invention have been made quite plain by the foregoing statement thereof and the specification.

The primary and fundamental advantage is that, without interfering in any way with the rendition of the standard entertainment records, and using time in the operation of an automatic phonograph which otherwise would be wasted, advertising messages may be given during this otherwise wasted time.

Also, the amplifier and loudspeaker hook-up of the automatic phonograph are employed in giving the advertising messages, with a supplementary circuit and solenoid such that when the mechanism switch cuts out the rendition of entertainment records by the automatic phonograph so that the operating motor for that purpose is also cut out, the amplifier and loudspeaker hook-up will be connected with the supplemental or advertising record to be used during the period of time when record changing takes place.

We claim:

1. In an attachment installed in the casing of an automatic phonograph, a timing switch comprising a contact wheel having thereon a multiplicity of contact members of different lengths, an advertising record, a circuit and instrumentalities operated thereby for operating the advertising record, means whereby contact with any one of said fingers will close a circuit, said several circuits being independently set up by moving the contact wheel one or more steps between playing of entertainment records, and means for moving said contact wheel, whereby the advertising message will be played following each rendition of an entertainment record or following the rendition of a plurality of said records, as determined by the circuit established by the contact fingers of different lengths.

2. In combination with an automatic phonograph, its case, amplifier, record changer, tone arm, tone arm shaft and means for operating them, an attachment adapted to be installed in the case, said attachment comprising an advertising record, a tone arm and means for operating them, a motor on the attachment, a motor circuit and switch for closing it, a cam on the automatic tone arm shaft so positioned relative to the switch that it contacts and closes the switch momentarily when the tone arm is swung by the groove on the record to its innermost position, a solenoid in circuit with the switch, an armature bar swung by the solenoid to circuit closing position during the short period of contact of the cam upon the switch, a latch for holding the armature bar in circuit closing position, and a second solenoid and armature for releasing the latch at the time of termination of the record changing operation.

3. In combination with an automatic phonograph, its case, amplifier, record changer, tone arm, tone arm shaft and means for operating them, an attachment adapted to be installed in the case, said attachment comprising an advertising record, a tone arm and means for operating them, a motor on the attachment, a motor circuit and switch for closing it, a cam on the automatic tone arm shaft so positioned relative to the switch that it contacts and closes the switch momentarily when the tone arm is swung by the groove on the record to its innermost position, a solenoid in circuit with the switch, an armature bar swung by the solenoid to circuit closing position during the short period of contact of the cam upon the switch, a latch for holding the armature bar in circuit closing position, a second solenoid and armature for releasing the latch, a circuit for said second solenoid including a switch, and a cam driven from the shaft of the attachment motor to close said last-named switch and release the latch and break the motor circuit at the time of termination of the record changing operation.

JAMES T. WILLIAMS.
KARL F. RIESE.

REFERENCES CITED

The following references are of record in the file of this patent:

UNITED STATES PATENTS

| Number | Name | Date |
|---|---|---|
| 1,642,702 | Strom | Sept. 20, 1927 |
| 2,125,100 | Coney | July 26, 1938 |
| 2,190,026 | Jacobson | Feb. 13, 1940 |
| 2,231,517 | Andres | Feb. 11, 1941 |